Oct. 27, 1959     M. R. TEK ET AL     2,910,424
SEPARATION AND RECOVERY OF OIL FROM OIL SANDS
Filed Nov. 19, 1956     2 Sheets-Sheet 1

INVENTORS
M. R. TEK
S. J. MARWIL
BY
Hudson and Young
ATTORNEYS

United States Patent Office 2,910,424
Patented Oct. 27, 1959

2,910,424

SEPARATION AND RECOVERY OF OIL FROM OIL SANDS

Mehmet R. Tek and Stanley J. Marwil, Bartlesville, Okla., assignors to Phillips Petroleum Company, a corporation of Delaware Application November 19, 1956, Serial No. 623,229

9 Claims. (Cl. 208—11)

This invention relates to the separation and recovery of oil from oil sands. In one aspect this invention relates to employing a hydraulic cyclone in the separation and recovery of oil from oil sands.

Oil sands (also known as tar sands and bituminous sands) are sands that are impregnated with a heavy petroleum. Deposits of these sands are found in many areas of the world where petroleum is found. Although some oil sands are unconsolidated, the viscous oil contained therein holds the sands together tenaciously, especially at low temperatures. These oil soaked sands vary in bulk density. Some deposits in Alberta, Utah, and California are actually free-flowing sands. Others are actually sandstones that must be crushed before being processed. Said oil sands are not to be confused with oil shale which is a completely different raw material. Oil shale can be defined broadly as a variety of compact sedimentary rock, generally laminated, that contains little or no oil but does contain an organic material derived from aquatic organisms or waxy spores and pollen grains, which is convertible to oil by heat.

For the past several years, the United States and Canadian Governments, as well as various independent workers in the field, have spent much time and money trying to develop a commercial process for the recovery of the oil to be found in oil sands. A number of processes including flotation methods, hot and cold water extraction methods, and methods employing a variety of solvents have been developed. However, so far as is now known, none of these processes has been successfully commercially developed.

We have discovered that the oil in oil sands can be separated from said sands by subjecting a suspension or slurry of the sands to the forces generated in a hydraulic cyclone. Thus, broadly speaking our invention comprises introducing a suspension or slurry of the oil sand into a hydraulic cyclone, subjecting said slurry to the forces developed in said cyclone, withdrawing a stream consisting essentially of sand from one end of said cyclone, and withdrawing a stream of oil and water from the other end or base portion of the cyclone. Said stream of oil and water is then processed for the recovery of the oil therefrom.

An object of this invention is to provide an improved method for the separation of oil from oil sands. Another object of this invention is to provide an improved method for the separation of oil from oil sands wherein a carefully prepared suspension or slurry of said sands in water is introduced tangentially into a hydraulic cyclone and therein subjected to the forces developed within said cyclone. Another object of this invention is to provide an improved method for the separation and recovery of oil from oil sands wherein a carefully prepared suspension or slurry of said sand is introduced into a hydraulic cyclone and the oil separated from said sands is recovered from one of the effluent streams from said cyclone. Other aspects, advantages, and objects of the invention will be apparent to those skilled in the art in view of this disclosure.

Figure 1:
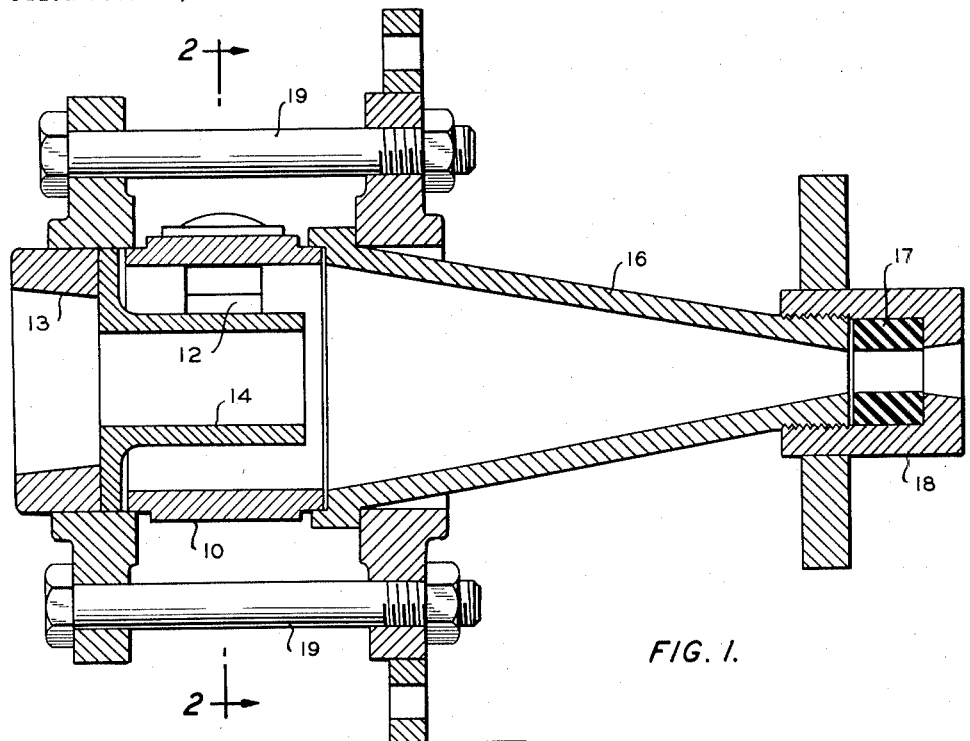
Figure 1 is a view, partly in section, of a hydraulic cyclone suitable for use in the practice of the invention.
Figure 2:
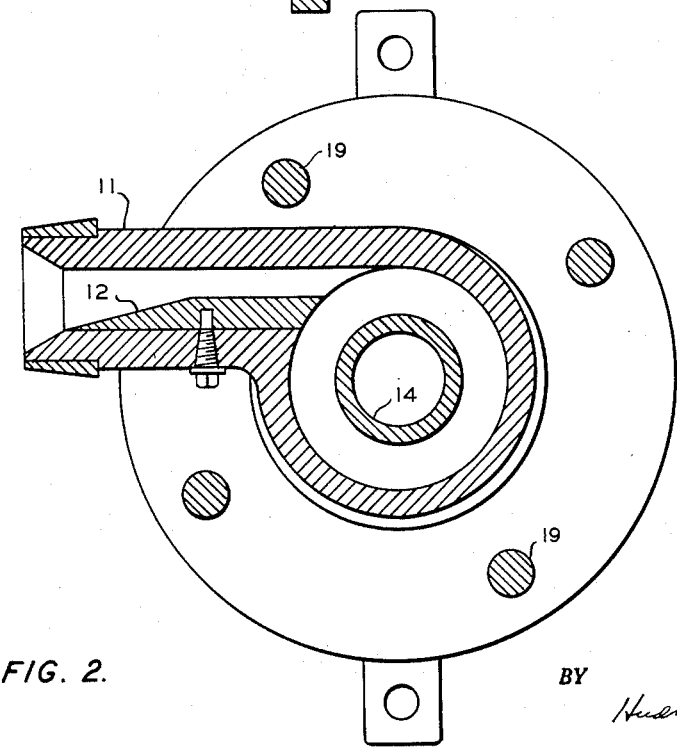
Figure 2 is a view, partly in section, along the line 2—2 of Figure 1.

Referring now to the drawings the invention will be more fully explained. In Figures 1 and 2, there is shown one form of a hydraulic cyclone which is suitable for use according to the invention. Said cyclone comprises a feed section or base portion 10 having a tangential feed inlet 11. Shim 12 is provided for varying the size of the opening in feed inlet 11. Obviously the opening in inlet 11 can be of fixed cylindrical dimensions. Overflow outlet 13 is positioned axially with respect to base portion 10 and the remainder of the cyclone. In the form here shown, said overflow outlet has a section 14 which extends axially into said feed section 10 below inlet 11. Said section 14 is commonly referred to in the art as a "vortex finder." It is not essential that the cyclone have a cylindrical feed section. The feed can be introduced tangentially at the base of the cone. Positioned below said feed section or base portion 10, is a vortex chamber or conical section 16 of constantly and uniformly decreasing diameter from said feed section to the apex of said conical section 16. Mounted at the apex of said conical section is an apex valve 17. Said valve can be attached to said conical section in any desired manner. As here shown, it is mounted within a valve holder 18 which in turn is threaded to said conical section 16. Valve 17 is a replaceable unit and units of different sizes can be inserted in said valve holder so as to vary the effective size of the apex outlet of said cyclone. The feed section and the conical section of said cyclone are held together by means of bolts 19, as shown.

In the operation of the cyclone illustrated in Figures 1 and 2, the feed material, a pumpable slurry or suspension, enters the feed section tangentially at the desired pressure and spirals downwardly toward the apex of the conical section in circles of decreasing diameter with increasing angular velocity. As a result of this spiral flow, a vortex or rotational swirl is created within the conical section and a centrifugal force is set up on the particles contained in the suspension. The particles having a higher specific gravity, or those which are otherwise more readily thrown or more readily forced outwardly, are thrown outward against or near the wall of the cone while the lighter particles, or those affected less by the centrifugal action, are carried or remain more nearly toward the inner surface of the downwardly moving and rotating stream. Actually, two concentrical vortices are formed within the cyclone because the vortex proceeds down the cone and causes the formation of an upward moving and whirling stream at the center of the cone and within said downwardly moving stream. Both vortices rotate in the same direction but their flows are opposed. The inner vortex moves axially toward the base of the cone and the outer vortex moves axially toward the apex of the cone. The material in said inner vortex exits through the overflow outlet nozzle and the material in said outer vortex exits through the underflow or apex outlet. The centrifugal forces in the inner vortex are even greater than the centrifugal forces in the outer vortex. Thus, as said inner vortex moves upwardly, some of the particles carried therein will be thrown out again into the outer vortex and will thus have another opportunity to enter the stream which is withdrawn from the apex of the conical section. Thus, there is a constant conflict between the centrifugal forces tending to throw the particles toward the outer wall of the cyclone and the forces effective near the conical boundaries. In a properly designed device, as will be understood by those skilled in the art, the centrifugal forces tending to throw the particles toward the outer wall can be maximized and very effective separations can be effected in the device.

In the above description of the operation of the cyclone, reference has been made to upward and downward flow. It should be understood, however, that the cyclone will operate efficiently regardless of the disposition of its axis and regardless of whether or not the cone points upwardly, downwardly, or horizontal. However, as a practical matter it is preferred to operate the cyclone in a vertical position so as to take advantage of gravitational forces. Reference to upward and downward movement has been made simply for convenience in discussing the operation.

Figure 3:
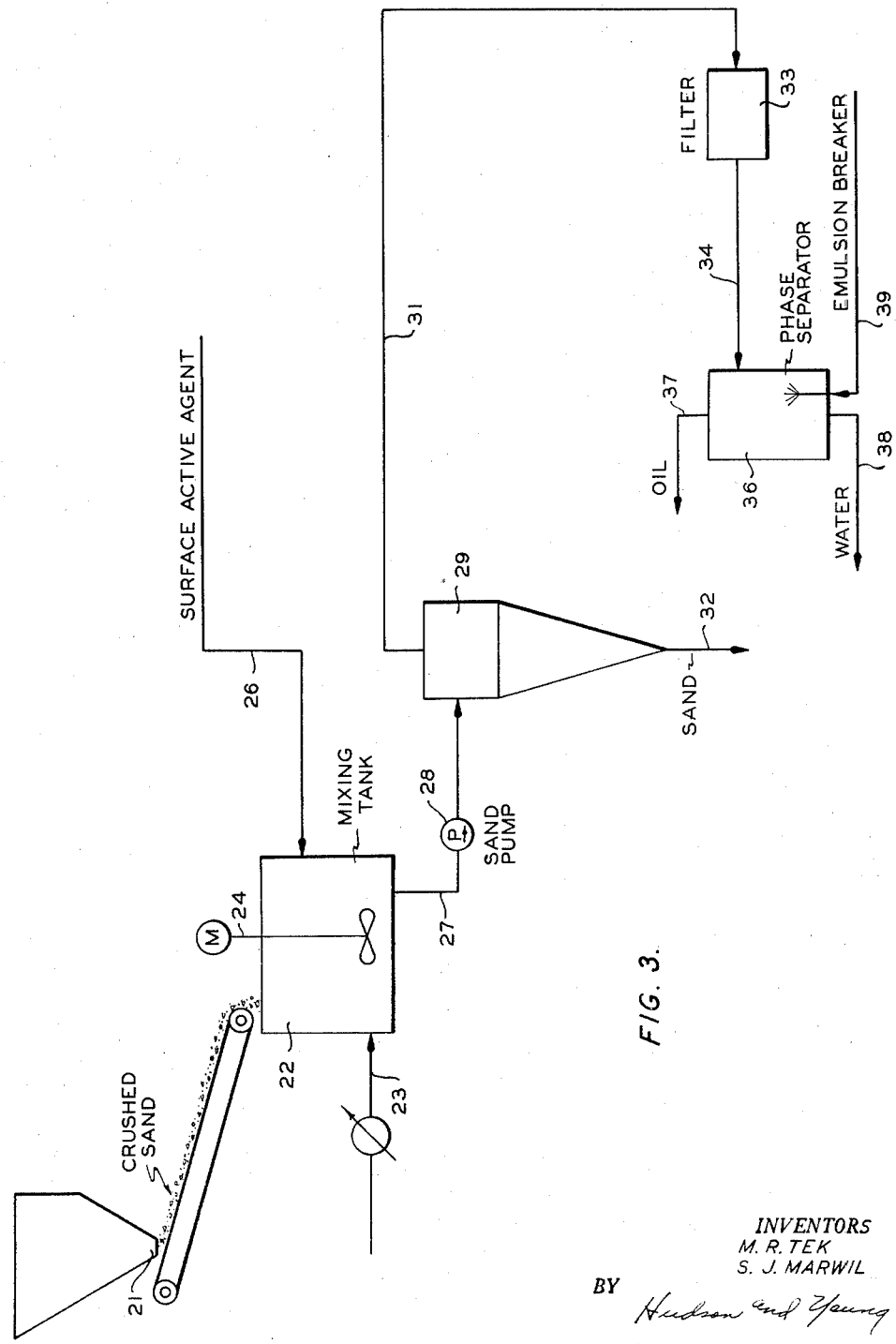
Figure 3 is a schematic flow sheet illustrating one embodiment of the method of the invention.

In the schematic flow sheet shown in Figure 3, a stream of crushed oil sands is introduced from spout 21 of a conventional crushing machine. Said crushing machine can be any suitable type of conventional equipment and for that reason the delivery spout only is here shown. The crushed sands are conveyed into mixing tank 22 wherein they are mixed with a stream of water introduced from line 23. Agitation can be provided by means of stirrer 24 or any other conventional means of agitation. If desired, a surface active agent of the wetting agent type can be introduced into said mixing tank through line 26. The suspension or slurry formed in tank 22 is withdrawn through line 27 and passed by means of a suitable sand pump 28 into cyclone 29. Said sand pump 28 can be any suitable type of sand pump. The Wilfley Pump Company of Denver, Colorado, manufactures and sells pumps suitable for this use. In cyclone 29, said suspension or slurry is separated into an overflow stream consisting essentially of water and oil together with a trace of sand, which stream is removed through line 31. An underflow stream consisting essentially of sand together with a small amount of water and oil is removed through line 32. Said overflow stream in line 31 is passed through filter 33 wherein the sand is filtered from the stream. Said filter 33 can be any suitable type of conventional filtering apparatus known to those skilled in the art. Said filtering apparatus can also comprise one or more filter units manifolded in parallel so that continuous operation is possible, i.e., one filter is on stream while the other is being cleaned. The filtered stream from filter 33 is passed via line 34 into phase separator 36 wherein a phase separation between the oil and water is effected. The oil is withdrawn through line 37 and the water is withdrawn through line 38. If desired, a surface active agent of the emulsion breaking type can be introduced into said phase separator through line 39.

The crushing of the oil sands can be effected in any suitable ball mill, hammer mill, jaw crushers, etc. Said crushing is not essential for all sands, such as the free-flowing sands referred to above. However, the oil sand should be comminuted or crushed to the extent that there are no "clumps" of sand and the material which is introduced into mixing tank 22 is essentially a stream of free-flowing particles. Usually, much improved results are obtained when the sands are crushed. Crushing of the sands appears to aid in destroying the bond between the oil and sand. Therefore, it is usually preferred that the sands be crushed to a particle size less than 1 millimeter diameter.

Mixing tank 22 can comprise any suitable type of an agitated mixing apparatus. The water introduced thereinto can be either at atmospheric temperature or heated to any desired temperature. Generally speaking, the use of water at an elevated temperature is preferred because it aids in destroying the bond between the oil and the sand. Temperatures within the range of 150 to 185° F. are preferred and temperatures within the range of 160 to 175° F. are usually more preferred. The amount of water employed in said mixing tank is usually an amount sufficient to give a slurry or suspension having a solids content within the range of 5 to 25 percent by weight, more preferably within the range of 10 to 20 percent by weight. Said mixing tank is preferably sized to give an average residence time for the sand particles of from 10 to 30 minutes, more preferably from 20 to 25 minutes. However, other suitable residence times can be employed.

In a presently preferred embodiment of the invention, a surface active agent of the "wetting agent" type is employed in mixing tank 22. It is not essential that this surface active agent be employed but the use of such an agent aids in destroying the bond between the sand and the oil. Any suitable surface active agent of the "wetting agent" type can be used. Examples of such surface active agents are Aerosol MA, Aerosol AY, both produced and sold by the American Cyanamid Company of New York, and the surface active agent known as MMO, produced and sold by the Atlas Powder Company of Wilmington, Delaware. The amount of said surface active agent employed will, of course, vary with the sand being processed, the amount of water employed, etc., as will be understood by those skilled in the art.

The operation of the cyclone and the separation effected therein is affected by several factors as will be understood by those skilled in the art. Most cyclones are described simply in terms of the diameter of the cylindrical feed section and the cone angle which is commonly 5 to 25 degrees. Other dimensions which affect cyclone operation include the size of the feed, overflow and underflow orifices. For fixed dimensions the feed rate becomes a function of the pressure drop across the cyclone, and this determines the centrifugal force which is developed. For example, when employing a four inch diameter cyclone with a ten inch conical section and feeding thereto, at a rate of 66 gallons per minute and a feed pressure 60 p.s.i.g., a slurry containing about 19 percent solids, it is found that a feed inlet having an internal diameter of three-quarter inch, an overflow outlet having an internal diameter of three-quarter inch, and an apex or underflow outlet having an internal diameter of five-eighth inch is suitable. In such an operation, the minimum velocity is about 48 feet per second. Any velocity greater than this will of course work. The velocity can be increased by increasing the feed pressure. Applying these principles to the separation of oil from oil sands, the efficiency of the separation ranges from about 80 to about 90 percent. The overflow stream will usually contain from 3 to 10 weight percent oil and from 97 to 90 weight percent water together with a trace of sand. The underflow stream composition varies from a trace of oil and water up to about 5 percent by weight of oil and water, the remainder being sand.

The invention is applicable to any oil sand of the types defined above. The Athabaska sands in Alberta, Canada, are the most widely known of the oil sands. The following example will serve to further illustrate the invention as applied to a sample of Athabaska oil sands. The example is given for illustrative purposes only and is not to be construed as limiting the invention.

Example 120 pounds per minute of Athabaska oil sand having an oil content of about 14 percent by weight is crushed to the extent that the particle size was less than 60 mesh. Said crushed sand is introduced into a mixing tank agitated with a motor driven stirrer and is there mixed with 60 gallons per minute of water introduced at a temperature of 170° F. to produce a slurry or suspension containing about 19.3 percent by weight of solids. 80 cc. per minute of Aerosol MA are introduced into said mixing tank to aid in the formation of said suspension or slurry. The residence time in said tank is about 21 minutes.

Said suspension or slurry is pumped at a rate of 66 gallons per minute and a pressure of 60 pounds per square inch gauge through a three-quarters inch I.D. inlet orifice and tangentially into the base portion of a four inch diameter cyclone with a ten inch cone section which gradually and uniformly tapers to a five-eighths inch underflow or apex nozzle. Said cyclone has a three-quarters I.D. inch overflow orifice axially positioned in said base portion or feed section. A stream containing about 3 percent by weight oil and about 97 percent by weight water together with a small amount of finely divided sand is removed through the overflow orifice. The remainder of the slurry introduced into said cyclone is removed through the underflow or apex orifice.

Said overflow stream of oil and water is filtered to remove the sand therefrom and then passed to a phase separation vessel wherein a surface active agent of the "emulsion breaker" type is introduced at a rate of about 30 cc. per minute. The surface active agent here employed is the type G-2854 produced and sold by the Atlas Powder Company. A stream of oil in an amount of about 15 pounds per minute or 900 pounds per hour is recovered from said phase separator.

While the invention has been described as being carried out employing one cyclone, obviously as many cyclones as desired can be manifolded together in parallel so as to increase the capacity of the processing plant. It is also within the scope of the invention to employ cyclones in series, if desired, and in various arrangements with respect to the overflow and underflow streams so as to further purify said streams if desired.

The invention has been described and illustrated as being carried out employing a cyclone having a vortex chamber comprising a conical section of constantly and uniformly increasing diameter. This is usually the preferred type of cyclone because, generally speaking, it is the most efficient. However, cyclones with a vortex chamber having a generally conical shape, or a cylindrical shape, are also operable. For example, the vortex chamber can be defined by successive conical frusta of increasing flatness toward the apex opening, or the inner surface of the vortex chamber can be smoothly curved, as the sides of a bowl, adjacent the apex opening. When the vortex chamber is cylindrical the feed is introduced tangentially and the overflow and underflow outlets are of different size. These different types of cyclones will be familiar to those skilled in the art and further discussion or illustration thereof is not believed necessary.

Various other modifications of the invention will be apparent and can be made by those skilled in the art in view of the above disclosure without departing from the spirit or scope of the invention.

We claim:

1. A method for the separation of oil from oil sands which comprises, in combination, the steps of: forming a suspension consisting essentially of said oil sand in water; introducing said suspension of said oil sand in water tangentially into a hydraulic cyclone at a pressure sufficient to produce centrifugal forces in excess of gravity whereby a vortex is formed within said cyclone; withdrawing a stream consisting essentially of sand from the apex of said cyclone; withdrawing a stream consisting essentially of water and oil from the base of said cyclone and separating said oil from said water.

2. A method for the separation of oil from oil sands which comprises, in combination, the steps of: forming a suspension consisting essentially of said oil sand in water; introducing said suspension of said oil sand in water tangentially into a confined circular space, said suspension being introduced into said space at a pressure sufficient to produce centrifugal forces in excess of gravity whereby a whirling vortex is formed within said confined space; withdrawing a stream consisting essentially of sand from one end of said space; withdrawing a stream consisting essentially of water and oil from the other end of said space and separating said oil from said water.

3. A method for the separation of oil from oil sands which comprises, in combination, the steps of: forming a suspension consisting essentially of said oil sand in water; introducing said suspension of said oil sand in water tangentially into the base portion of a confined circular space of gradually and uniformly decreasing diameter, said suspension being introduced into said space at a pressure sufficient to produce centrifugal forces in excess of gravity whereby a whirling vortex is formed within said confined space; withdrawing a stream consisting essentially of sand from the region of minimum diameter of said space; withdrawing a stream consisting essentially of water and oil from an axial opening provided in said base portion of said confined space and separating said oil from said water.

4. A method for separating and recovering oil from oil sands which method comprises, in combination, the steps of: comminuting said oil sands; passing comminuted oil sands to a mixing tank and therein forming a suspension consisting essentially of said comminuted oil sands in water; introducing a stream of said suspension tangentially into the base portion of a hydraulic cyclone; withdrawing a stream consisting essentially of sand from the apex of said cyclone; withdrawing another stream consisting essentially of water and oil from an axial outlet in the base portion of said cyclone; filtering said stream of water and oil to remove traces of sand therefrom; passing said filtered stream of oil and water to a phase separation zone; withdrawing a stream of water from said separation zone; and recovering a stream of oil from said phase separation zone.

5. A method according to claim 4 wherein said oil sands are crushed to a particle size less than 1 millimeter diameter.

6. A method for separating and recovering oil from oil sands which method comprises, in combination, the steps of: crushing said oil sand to a particle size less than 1 mm., diameter; passing crushed oil sands to a mixing zone; passing a stream of water to said mixing zone and therein forming a suspension consisting essentially of said crushed oil sands in water; introducing a suitable surface active wetting agent into said mixing zone to aid in forming said suspension; passing said suspension to a cyclone separation zone; withdrawing a stream consisting essentially of sand as an underflow stream from said cyclone separation zone; withdrawing a stream consisting essentially of water and oil as an overflow stream from said cyclone separation zone; filtering said overflow stream to remove traces of sand therefrom; passing filtered overflow stream to a phase separation zone; introducing a suitable surface active emulsion breaker into said separation zone; withdrawing a stream of water from said phase separation zone; and withdrawing a stream of oil separated from said oil sands from said phase separation zone.

7. A method according to claim 5 wherein a suitable surface active wetting agent is introduced into said mixing zone.

8. A method according to claim 6 wherein said oil sand and said water are passed to said mixing zone in amounts such that said suspension contains from 5 to 25 weight percent sand, and said water passed to said mixing zone is heated to a temperature within the range of 150 to 185° F.

9. A method according to claim 7 wherein said suspension contains from 10 to 20 weight percent sand and said water is heated to a temperature within the range of 160 to 175° F.

References Cited in the file of this patent

UNITED STATES PATENTS

| | | |
|---|---|---|
| 2,717,695 | Martin | Sept. 13, 1955 |
| 2,769,751 | Paull | Nov. 6, 1956 |
| 2,790,750 | Eyre | Apr. 30, 1957 |
| 2,793,104 | Rees | May 21, 1957 |
| 2,825,677 | Coulson | Mar. 4, 1958 |

FOREIGN PATENTS

| | | |
|---|---|---|
| 651,094 | Great Britain | Mar. 14, 1951 |